(12) United States Patent
Malherbe et al.

(10) Patent No.: US 8,283,931 B2
(45) Date of Patent: Oct. 9, 2012

(54) QUALIFYING OF A DETECTOR OF NOISE PEAKS IN THE SUPPLY OF AN INTEGRATED CIRCUIT

(75) Inventors: Alexandre Malherbe, Trets (FR); Benjamin Duval, Saint-Maximin (FR)

(73) Assignee: STMicroelectronics S.A., Montrouge (FR)

( * ) Notice: Subject to any disclaimer, the term of this patent is extended or adjusted under 35 U.S.C. 154(b) by 1487 days.

(21) Appl. No.: 11/818,691

(22) Filed: Jun. 15, 2007

(65) Prior Publication Data
US 2008/0012574 A1    Jan. 17, 2008

(30) Foreign Application Priority Data
Jun. 29, 2006    (FR) .................................... 06 52713

(51) Int. Cl.
*G01R 27/02*    (2006.01)
(52) U.S. Cl. ................... 324/606; 324/750.15; 714/736
(58) Field of Classification Search .................. 324/523; 327/62
See application file for complete search history.

(56) References Cited

U.S. PATENT DOCUMENTS

| | | | | |
|---|---|---|---|---|
| 4,575,683 A * | 3/1986 | Roberts et al. | ................. | 329/311 |
| 5,594,384 A * | 1/1997 | Carroll et al. | ................. | 329/369 |
| 6,362,738 B1 * | 3/2002 | Vega | ........................... | 340/572.1 |
| 6,807,507 B2 * | 10/2004 | Kumar et al. | ................. | 702/124 |
| 6,828,859 B2 * | 12/2004 | Dupuis | ......................... | 330/279 |
| 7,085,979 B2 * | 8/2006 | Kim et al. | ...................... | 714/734 |
| 7,248,124 B2 * | 7/2007 | McCorquodale et al. | ...... | 331/44 |
| 7,342,408 B2 * | 3/2008 | Kim | ........................ | 324/762.08 |
| 7,839,182 B2 * | 11/2010 | Malherbe et al. | .............. | 327/58 |
| 8,115,505 B2 * | 2/2012 | Ryu | ........................ | 324/760.01 |
| 2001/0011903 A1 * | 8/2001 | O'Neill et al. | ................ | 324/763 |
| 2002/0186038 A1 | 12/2002 | Bretschneider | | |
| 2003/0101016 A1 | 5/2003 | Kumar et al. | | |
| 2003/0226082 A1 | 12/2003 | Kim et al. | | |
| 2007/0139988 A1 * | 6/2007 | Malherbe et al. | .............. | 365/43 |
| 2009/0278562 A1 * | 11/2009 | Zaitsu | ........................... | 324/765 |
| 2012/0006114 A1 * | 1/2012 | Caminada et al. | ......... | 73/504.12 |

FOREIGN PATENT DOCUMENTS

FR    2 557 703 A1    7/1985

OTHER PUBLICATIONS

French Search Report from corresponding FrenchApplication No. 06/52713, filed Jun. 29, 2006.

* cited by examiner

*Primary Examiner* — Richard Isla Rodas
(74) *Attorney, Agent, or Firm* — Wolf, Greenfield & Sacks, P.C.

(57) ABSTRACT

A method and a system for qualifying an integrated circuit according to a parasitic supply peak detector that it contains, including: supply of the integrated circuit to be tested under at least a first voltage; checking of a starting of the circuit; application of at least one first noise peak on the circuit power supply, while respecting an amplitude and time gauge; and comparison of average currents consumed by the circuit before and after the peak.

19 Claims, 4 Drawing Sheets

QUALIFYING OF A DETECTOR OF NOISE PEAKS IN THE SUPPLY OF AN INTEGRATED CIRCUIT

BACKGROUND OF THE INVENTION

1. Field of the Invention

The present invention generally relates to electronic circuits and, more specifically, to the detection of incidental or voluntary disturbances in an electronic circuit power supply. The present invention more specifically applies to the qualifying of an electronic circuit provided with a detector of such disturbances.

2. Discussion of the Related Art

FIG. 1 schematically shows a smart card 10 of the type to which the present invention applies as an example. Such a card is most often formed of a plastic support on or in which is placed an integrated circuit chip 1 associated with contacts 2 of communication with a terminal (not shown), or with radiofrequency transceiver elements for a contactless communication.

FIG. 2 is a schematic block diagram of a second example of application of the present invention to a receiver 20 (STB) of signals broadcast in controlled fashion, for example, a decoder of television signals received by a satellite antenna 21 for display on a screen 22 of television screen type. The decoding of the received transmissions is subordinate to rights of access managed by decoder 20 (for example, of the type known as a Set Top Box). In certain cases, decoder 20 comprises a smart card reader 10 of the type illustrated in FIG. 1, with an integrated circuit 1 containing rights of access (more specifically an identifier and generally a deciphering key) necessary to correctly decode the transmissions. In other cases, circuits (not shown) internal to decoder 20 comprise elements for managing rights of access (especially for a deciphering).

FIG. 3 is a schematic block diagram of a microcontroller 1, for example, of a smart card, to which the present invention applies as an example. Such a circuit comprises a central processing unit 31 (CPU) capable of executing programs most often contained in a non-volatile memory 32 (NVM), for example, of ROM or EEPROM type. One or several buses 33 convey address, control, and data signals between the different elements of circuit 1 and between all or part of these elements and an input/output interface 34 (I/O) for communicating with or without contact with the outside. Most often, volatile memory elements 35 (MEM) of RAM type and/or of register type are contained in circuit 1. Other functions (block 36, FCT) may also be integrated to circuit 1 according to the application. For example, such functions may comprise a ciphering cell, an integrity check cell, etc.

Circuit 10 manipulates digital quantities (be they program or data instructions) which, in the applications aimed at by the present invention, condition the access to certain data (for example, programs to be broadcast). These may be secret keys of ciphering algorithms, secret authentication codes, algorithmic steps of a program, etc.

Different attacks are likely to be implemented to attempt to discover the secrets of the integrated circuit or making inoperative a protection of the processed data, by examining input-output signals and/or the circuit consumption, or any other quantity influenced by its operation. In particular, so-called fault-injection attacks comprise causing a disturbance in the operation of integrated circuit 1 on execution of a cryptography or decoding algorithm, and interpreting its subsequent operation to attempt to discover the secret quantities. More simply, the disturbance may generate a jump in a program aiming at not executing instructions capable of preventing access to data.

FIG. 4 schematically illustrates the most common disturbance in fault-injection attacks. This drawing shows an integrated circuit 1 (IC) supplied, between two terminals 41 and 42, with a voltage Valim and issuing at least one result on an output terminal OUT. A disturbance P on the supply of circuit 1 comprises causing a noise peak in the circuit power supply.

To attempt to defeat such attacks, integrated circuits comprise software and/or hardware tools (countermeasures) that respond to a disturbance in the circuit operation, to block its operation, prevent the output of confidential data, making the result of a calculation unexploitable, etc. when a fraud attempt is detected.

Among such tools, the present invention more specifically relates to hardware detectors of a disturbance in the power supply of a circuit, for example, directly acting on the circuit by resetting the central processing unit, thus forbidding the possible hacker to take advantage of the disturbance. The need for such power supply noise peak detectors is especially due to the imperfection of voltage regulators most often equipping electronic circuits, since miniaturization needs prevent the use of filtering capacitors of sufficient size.

FIG. 5 schematically shows a first conventional example of a circuit 50 for detecting noise peaks in the power supply of an electronic circuit. This detector is based on a voltage comparator 51 (COMP) having its two inputs receiving a voltage proportional to supply voltage Valim after filtering by resistive and capacitive circuits exhibiting different time constants. Voltage dividers (resistors R52 and R53 in series and resistors R54 and R55 in series) between a terminal 41 of application of voltage Valim and ground 42 are coupled to the two input terminals (− and +) of comparator 51, a capacitor C56, respectively, C57, connecting the corresponding comparator input (midpoint of the associated resistive bridge) to ground 42 to form the filtering cell. The output of comparator 51 is connected, possibly through a level adapter element, not shown, to a terminal R for resetting central processing unit 31. The circuit of FIG. 5 is described, for example, in document US-A-2003/0226082. The values given to the filtering cells define different time constants to detect power supply noise.

FIG. 6 schematically shows a second conventional example of a circuit 60 for detecting noise peaks in the power supply of an electronic circuit. It shows a comparator 61 triggering a reset of central processing unit 31. The detector of FIG. 6 is based on the use of a diode D62 in series with a resistor R63 between terminal 41 of application of voltage Valim and ground 42, their junction point 64 being connected to an input terminal (for example, inverting (−)) of comparator 61, the other comparator terminal (+) being grounded. The anode of diode D62 is connected to junction point 64. The circuit of FIG. 6 detects peaks causing a polarity reversal between terminals 41 and 42 to reset central processing unit 31. As compared with the circuit of FIG. 5, detector 60 of FIG. 6 only operates for polarity reversal peaks but enables detection of shorter peaks.

FIG. 7 shows another improved example of a circuit 70 for detecting noise peaks. A P-channel MOS transistor MP71 is used as a comparator of the voltage assumed to be positive Valim applied between a positive terminal 41 and a ground terminal 42 with respect to another average value Vm of voltage Valim minus an offset voltage Voff. A dividing bridge, formed in this example of two resistive elements R73 and R74 in series between terminals 41 and 42, has its midpoint 75 connected to the source of transistor MP71, a capacitive element C76 connecting this midpoint to ground 42. Functionally, point 75 corresponds to a low-pass filter output while the gate of transistor MP71 forms a first input (inverting) of a comparator having its non-inverting input formed by its source. Drain 77 of transistor MP71 is preferably grounded by a current source (here, a resistor R78) and forms the output terminal of circuit 70. The voltage across resistor R78 forms detection signal DETECT. This signal is a signal in all-or-nothing. The function of resistor R78 is to provide, between its terminals, a voltage representative of the detection by pulling part of the current down to ground.

Transistor MP71 is on when noisy voltage Valim, decreased by average value Vm set by elements R73 and C76, becomes greater than or equal to the absolute value of threshold voltage Vt of transistor MP71. The offset (Voff) with respect to the average level (Vm) is, as a first approximation, set by resistances R73 and R74 and by threshold voltage Vt (Voff=(R1*Valim)/(R73+R74)+|Vt|, where |Vt| is the absolute value of voltage Vt).

The condition on the conduction of transistor MP71 is settable by resistance R74. The higher the value of resistance R74, the lower offset voltage Voff. Resistor R78 may be replaced with an active current source, provided for its equivalent resistance to be greater than the value of resistor R73 to avoid absorbing the noise peaks to be detected.

A similar assembly may be formed for a detection of positive noise peaks, by replacing P-channel transistor MP71 with an N-channel transistor, the rest of the assembly being identical. According to another variation, terminals 41 and 42 do not directly see the integrated circuit supply voltage but see a reduced voltage, point 41 for example corresponding to the midpoint of a resistive divider.

FIG. 8 shows a second example of the forming of a detector of negative noise peaks based on the same principle as detector 70' of FIG. 7. As compared with FIG. 7, resistor R74 has been eliminated, thus avoiding any quiescent consumption, capacitor C76 has also been eliminated, the source-substrate stray capacitance of transistor MP71 playing a similar role. The offset voltage of such an assembly is here not only a function of the value of resistor R73 and of threshold value Vt of transistor MP71, but also of its gate width-to-length ratio and of the value of output current source R78, the effects of which can no longer be neglected.

It would be desirable to be able to qualify an integrated circuit as to its resistance to attacks by injection of parasitic supply peaks.

It would also be desirable to be able to determine the type of detector equipping the circuit without it being necessary to make extensive investigations of the circuit integrating the detector (reverse engineering).

SUMMARY OF THE INVENTION

At least one embodiment of the present invention aims at determining whether an integrated circuit is equipped with a detector of parasitic supply peaks.

At least one embodiment of the present invention more specifically aims at enabling qualification of an integrated circuit comprising such a detector, without requiring investigations and analyses within the circuit.

At least one embodiment of the present invention also aims at a solution providing information as to the performances of the possible detector comprised by the circuit.

To achieve all or part of these objects, as well as others, at least one embodiment of the present invention provides a method for qualifying an integrated circuit according to a parasitic supply peak detector that it comprises, comprising at least steps of:

supply of the integrated circuit to be tested under at least a first voltage;

checking of a starting of the circuit;

application of at least one first noise peak on the circuit power supply, while respecting an amplitude and time gauge; and comparison of average currents consumed by the circuit before and after the peak.

According to an embodiment of the present invention, said steps are reproduced under at least a second circuit supply voltage with a second noise peak different from the first one.

According to an embodiment of the present invention, said second voltage is smaller than the first one.

According to an embodiment of the present invention, the detectors to be qualified are distributed in three categories according to whether they comprise:

a differential comparator of an average value of the voltage with respect to a threshold;

a differential comparator of an instantaneous reversal of the polarity of the supply voltage; or a comparator of an instantaneous value of the supply voltage with respect to a threshold of same polarity.

According to an embodiment of the present invention, the amplitude of the noise peak is selected to maintain a minimum voltage of supply of differential stages of the circuit to be tested.

According to an embodiment of the present invention, the first and second supply voltages are selected according to the supply voltage range acceptable by the integrated circuit.

According to an embodiment of the present invention, the respective amplitudes of the first and second peaks are selected according to the current supply voltage of the integrated circuit and to the threshold voltage of transistors that it contains.

According to an embodiment of the present invention, the respective durations of the first and second peaks are selected according to the transition frequency of the integrated circuit transistors.

The present invention also provides a system for qualifying an integrated circuit as a parasitic supply peak detector, comprising:

controllable means for supplying the integrated circuit;

means for measuring the circuit consumption;

means for memorizing the measured consumption;

controllable means for generating at least one noise peak respecting an amplitude and time gauge; and a unit of control and synchronization of the different elements, capable of comparing the average consumptions of the circuit before and after sending of a peak on its power supply.

The foregoing and other objects, features, and advantages of the present invention will be discussed in detail in the following non-limiting description of specific embodiments in connection with the accompanying drawings.

DETAILED DESCRIPTION

Figure 1:
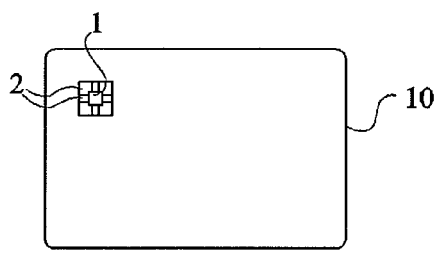
FIG. 1, previously described, shows a smart card of the type to which the present invention applies as an example.
Figure 2:
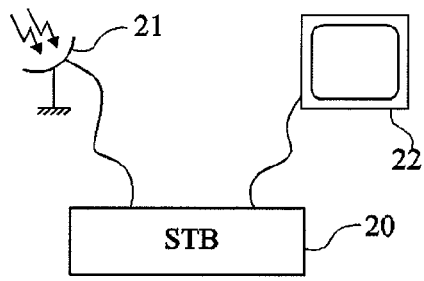
FIG. 2, previously described, shows a television signal decoder system of the type to which the present invention applies as an example.
Figure 3:
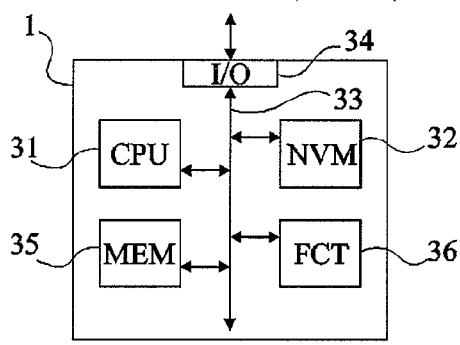
FIG. 3, previously described, is a schematic block diagram of an example of an integrated circuit of the type to which the present invention applies.
Figure 4:
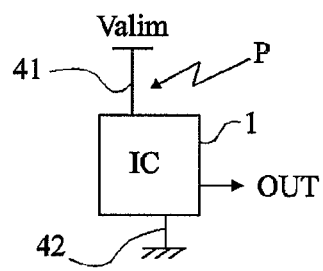
FIG. 4, previously described, illustrates the problem to solve to detect a noise peak on the power supply of an integrated circuit.

The same elements have been designated with the same reference numerals in the different drawings. For clarity, only those elements and steps which are useful to the understanding of the present invention have been shown and will be described. In particular, what exploitation is made by an integrated circuit of the detection of a noise peak on its power supply has not been detailed, the present invention being compatible with any countermeasure system.

The present invention originates from an interpretation of the operation of the different types of detectors of noise peaks on the power supply of an integrated circuit in terms of amplitude and duration of the peak.

Figure 7:
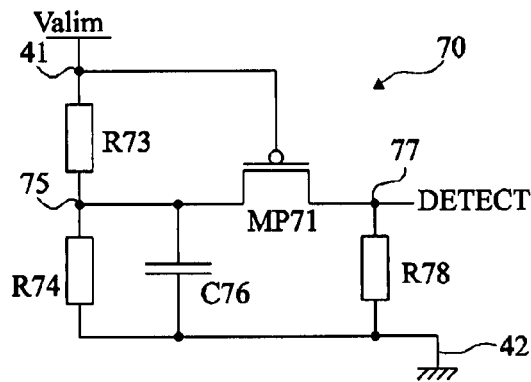
FIG. 7, previously described, shows a third example of a noise peak detector.
Figure 8:
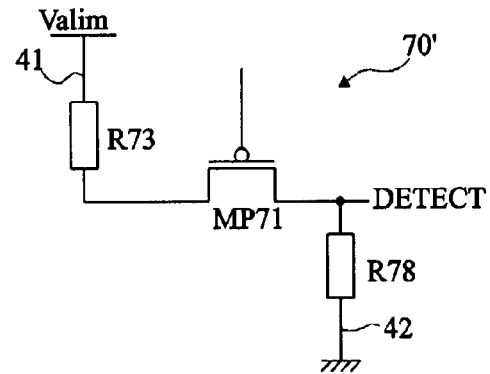
FIG. 8, previously described, shows a fourth example of a noise peak detector.
Figure 9:
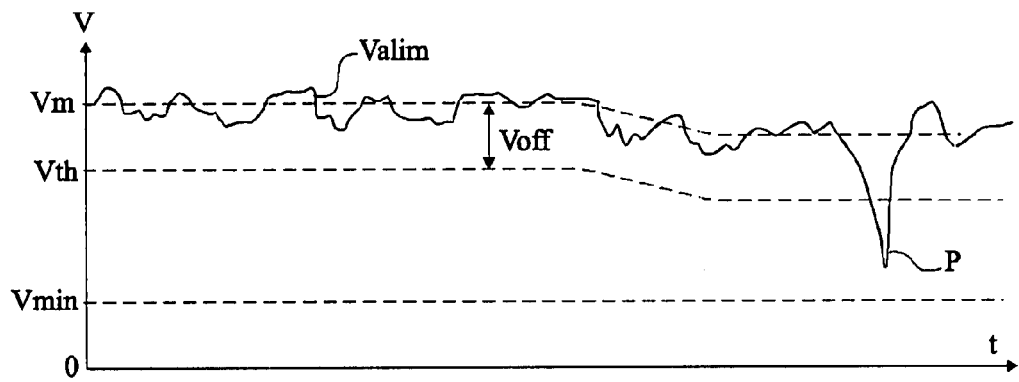
FIG. 9 is a timing diagram illustrating the operation of noise peak detectors.

FIG. 9 is a simplified timing diagram of shapes of voltages along time illustrating the operation of the detectors of FIGS. 5 to 8. In FIG. 9, an arbitrary example of a noisy shape of voltage Valim has been shown, as well as its average value Vm exploited by the assemblies of FIGS. 7 and 8. A detection threshold Vth has also been shown, offset by an amplitude Voff with respect to average value Vm.

Figure 5:
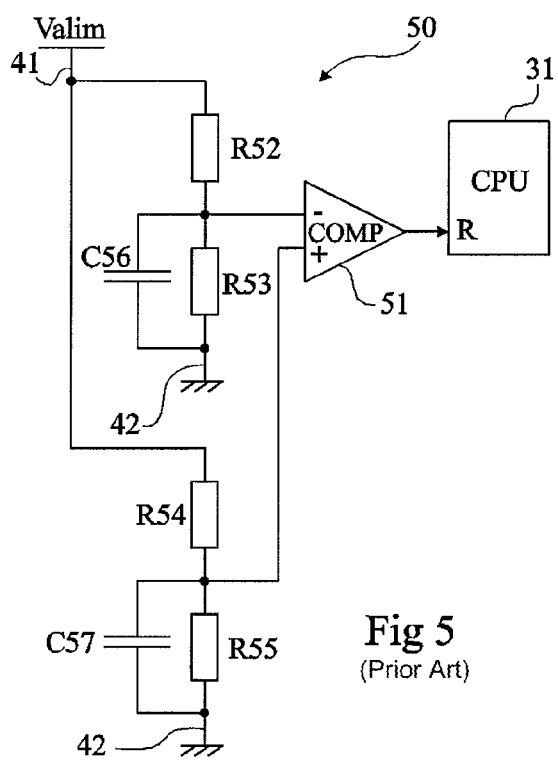
FIG. 5, previously described, shows a first conventional example of a noise peak detector.

The fact of applying an approximately constant offset between average value Vm and detection threshold Vth as provided by the assemblies of FIGS. 5, 7, and 8 enables avoiding slow variations of the supply voltage which should not be mistaken for noise, which would risk being the case with a constant threshold.

A difference between the assembly of FIG. 5 and the assemblies of FIGS. 7 and 8 is the possibility for the latter to detect shorter peaks P which are not detected by the assembly of FIG. 5. Indeed, the assembly of FIG. 5 compares average value Vm with threshold Vth while the assemblies of FIGS. 7 and 8 compare instantaneous value Valim with threshold value Vth.

Figure 6:
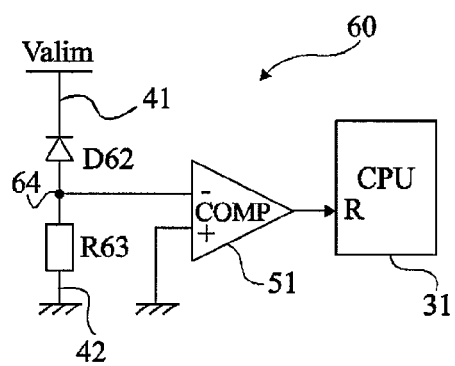
FIG. 6, previously described, shows a second conventional example of a noise peak detector.

As to the assembly of FIG. 6, it is only able to detect peaks causing an reversal in the supply voltage or peaks of high amplitude reaching a minimum operating voltage Vmin of comparator 61.

Figure 10:
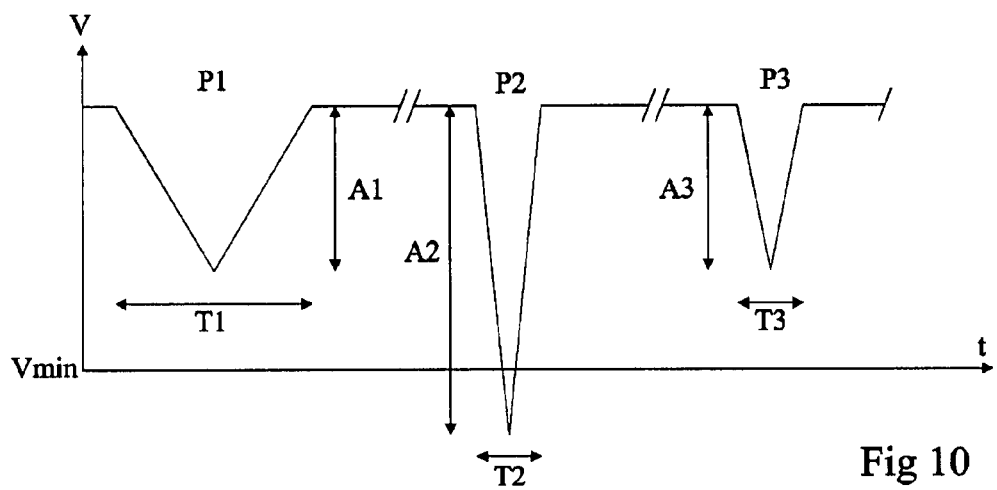
FIG. 10 shows a classification according to an embodiment of the present invention of parasitic supply peaks likely to be detected.

FIG. 10 is a simplified timing diagram illustrating three noise peak gauges P1, P2, and P3 on a voltage V.

A first peak P1 is of amplitude A1 and duration T1. A second peak P2 is of amplitude A2 and duration T2. Amplitude A2 is such that it reverses the circuit supply voltage (amplitude cutting minimum voltage level Vmin) and duration T2 is shorter, by a ratio of at least three, than duration T1. A third peak P3 of amplitude A3 and of duration T3 represents a third category of noise peaks, duration T3 being of the same order of magnitude as duration T2 and amplitude A3 being of the same order of magnitude as amplitude A1, not reaching level Vmin.

The three peaks P1, P2, and P3 of FIG. 10 may be considered as limiting gauges of detectable peaks to determine the presence of a detector in an integrated circuit and qualify this detector.

A detector capable of detecting only peak P1 and detecting neither peaks P2 and P3 is considered as belonging to a first category, typically shown in FIG. 5, that is, measuring an average value of the supply voltage with respect to a threshold.

A detector only detecting a peak P2, of sufficient amplitude to invert the integrated circuit supply voltage or at least go below a minimum operating voltage of a comparator in the technology of this circuit, is considered as belonging to a second category corresponding to the detector of FIG. 6, that is, of diode type.

A detector capable of detecting the three peaks P1, P2, and P3 belongs to a third category, gathering the detectors of FIGS. 7 and 8.

The examination of the detection of a noise peak by a detector is, according to the present invention, performed by checking whether the integrated circuit responds to the occurrence of at least one noise peak. This response is determined by comparison of the consumption or of the average current consumed by the circuit before and after sending of the noise peak by a qualification system. If the circuit has detected the peak, the countermeasure that it implements necessarily causes a modification in the average consumed current, be it a reset internal to the detector or any other countermeasure.

The present inventors have further found that the capacity to detect noise peaks of a detector depends, for the detectors of first and second categories using a comparator in the form of differential amplifiers, on the supply voltage. Indeed, the supply voltage conditions the speed performance (transition frequency) of the integrated circuit switches and in particular the slope of the differential stages that it comprises. This supply voltage thus conditions the speed of the detectors made in the form of amplifiers (first and second categories of FIGS. 5 and 6). For such detectors, a peak of same duration may be detected or not according to the circuit supply voltage. However, provided for the supply voltage to be sufficient for the integrated circuit operation, third category detectors are operative.

Figure 11:
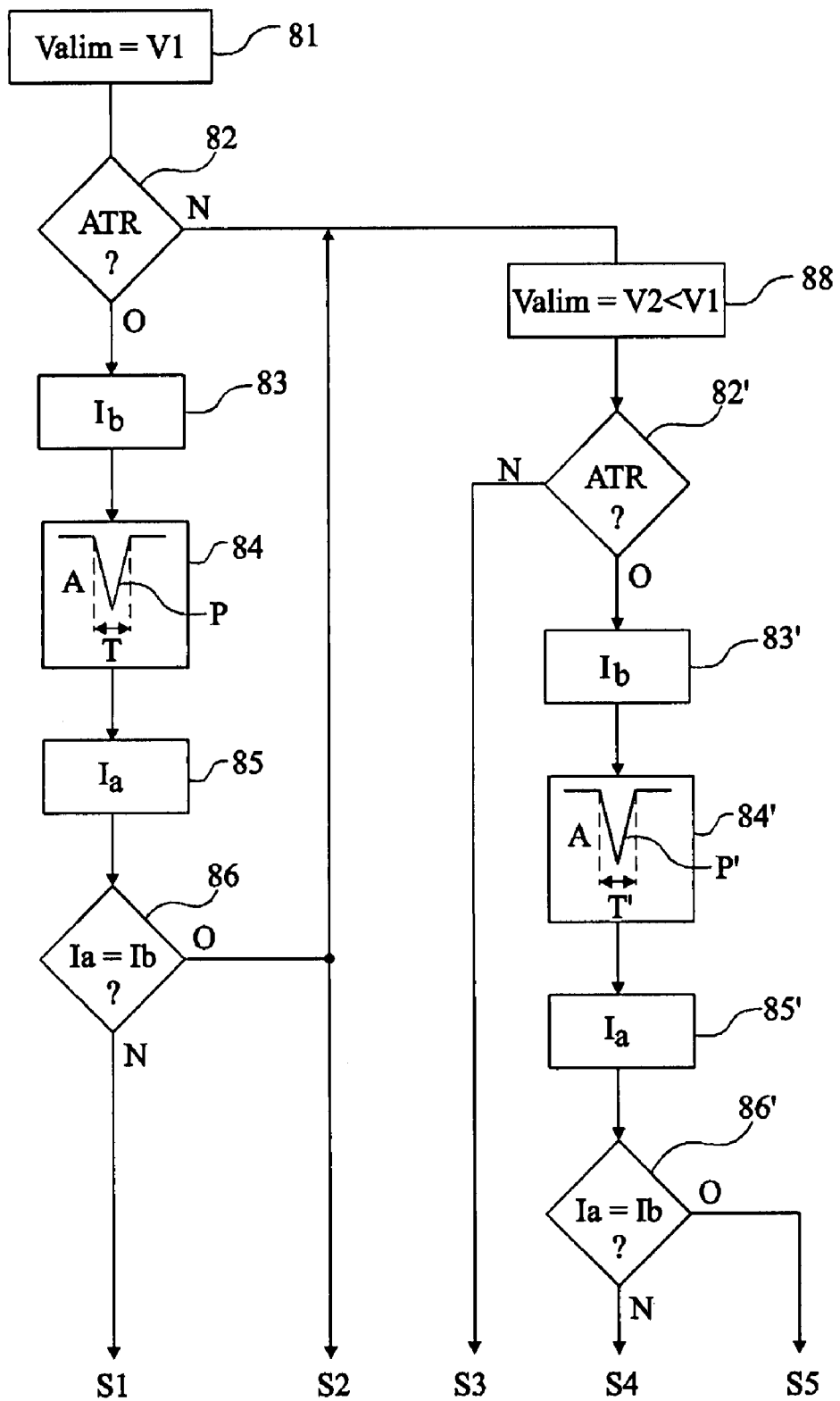
FIG. 11 is a block diagram illustrating an embodiment of the integrated circuit qualification method according to the present invention.

FIG. 11 is a functional block diagram illustrating a preferred embodiment of the qualification method of the present invention. In the following discussion, the characteristics of the integrated circuits are assumed to be known at least in terms of transition frequency with respect to the supply voltage. Such characteristics depend on the technology and a preferred estimation mode will be given hereafter. This amounts to saying that limiting gauges P1, P2, and P3 are assumed to be known for the circuit technology.

A circuit to be qualified is supplied (block 81, Valim=V1) with a first voltage V1.

A first step (block 82, ATR?) comprises checking whether supply voltage V1 is sufficient for the circuit start up. For this purpose, a control signal or a stimulus to which the circuit to be tested is supposed to respond is sent thereto. For example, the case in point is to check whether the circuit provides on its input/output ports an answer to reset (ATR). The case in point may also be to check the connection of a USB peripheral.

If test 82 is positive (output O of block 82), the system measures and stores (block 83, Ib) average current Ib of the circuit before disturbance.

Then (block 84), the system sends onto the supply of the circuit to be tested a noise peak P of amplitude A and of duration T. In the example, the sending of a negative noise peak on a positive supply voltage is assumed. The opposite is of course possible and will easily be understood from the following description. Amplitude A is selected so as, under voltage V1, not to reach the minimum voltage level which would be detected as an reversal (for example, A=A1=A3). Duration T is selected so as, under voltage V1, to be detectable by first category detectors (T=T1).

The system then measures (block 85, Ia) and memorizes average current Ia after the noise peak, to determine whether the circuit has responded to this peak by means of its possible detector.

Then, the system compares (block 86, Ia=Ib?) the average currents before and after the peak. The time constant of integration of the average current value is selected to be greater than the maximum duration of the peaks to be simulated.

If the circuit does not modify its operation (output N of test 86), this means (flag S1 active) either that the integrated circuit has no noise peak detector, or that it has a second category detector. In the opposite case (output O of test 86), this means (flag S2 active) that the circuit has a detector of the first or third category.

This test is performed again for a second supply voltage V2 smaller than the first one (block 88, Valim=V2<V1). This second test is also performed in case of a negative output of test 82.

Steps 82', 83', 84', 85', and 86', similar to steps 82 to 86, are then carried out under supply voltage V2. In the case where the circuit does not start, the qualification test stops (flag S3 active) and the results are interpreted.

If the circuit has started under second voltage V2, the comparison of the average currents before and after a second peak P' (block 86') improves the detection of the first execution. For example, peak P' is selected so as to, under voltage V2, be of a duration insufficient to be detected by the detectors of the first and second categories. It for example respect the gauge (A'=A3, T'=T3) of the third category.

In case of a positive detection (output O) of block 86, this means (flag S5 active) that the detector is of the third category. In case of a negative output of block 86 (flag S4 active), this means that it belongs to the first category.

Assuming levels S1 to S5 to be active at state 1, the results may be interpreted as illustrated by table I hereafter. In this example, a peak P (block 84) selected, under voltage V1, to be of amplitude A=A1=A3 and of duration T=T1, and a peak P' (block 84') selected to be, under voltage V2, of amplitude A'=A1=A3 and of duration T=T3, are assumed. The states shown below must of course need to be adapted if some flags have a quiescent level at state 1.

TABLE I

| 1 | 2 | 3 | 4 | 5 | Detector category |
|---|---|---|---|---|---|
|   |   |   |   |   | No detector |
|   |   |   |   |   | Mis-selected voltages |
|   |   |   |   |   | None or category 2 |
|   |   |   |   |   | Insufficient voltage V 2, category 1 or 3 under V 1 |
|   |   |   |   |   | Category 1 |
|   |   |   |   |   | Category 3 |

According to a first alternative embodiment, steps 83 to 86, under voltage V1, are carried out a second time with a peak gauge P2 (A=A2, T=T2) to differentiate the lack of a detector from a second category detector.

According to another variation, the method of FIG. 11 is implemented with peaks P and P' respectively having amplitudes A=A2 and A'=A3 and durations T=T2=T3 and T'=T2=T3. Table II hereafter then gives an example of interpretation of the results.

TABLE II

| 1 | 2 | 3 | 4 | 5 | Detector category |
|---|---|---|---|---|---|
|   |   |   |   |   | Mis-selected voltages |
|   |   |   |   |   | None or category 1 |
|   |   |   |   |   | Insufficient voltage V 2, category 2 or 3 under V 1 |
|   |   |   |   |   | Category 2 |
|   |   |   |   |   | Category 3 |

In this variation, an additional execution of steps 83 to 86 with a gauge peak P1 enables removing the uncertainty on the existence of a first category detector.

The present invention enables detecting the presence, in an integrated circuit, of a noise peak detector and, with a decreased number of tests, qualifying this detector according to its sensitivity.

Another advantage of the present invention is that it avoids any reverse engineering intervention within the circuit.

Different variations may be provided to refine the detection or qualify this detection under more than two supply voltages. In the extreme, for each supply voltage, noise peaks respecting the different gauges are successively applied.

According to another alternative embodiment, supply voltages V1 and V2 are inverted, that is, it is started by performing a test under a relatively low voltage, then under a relatively high voltage.

The amplitude and the duration of the noise peaks sent by the test system are preferentially selected according to the breakdown voltage of the transistors forming this circuit.

Technologically, this breakdown voltage is set by the gate oxide thickness of the different MOS transistors of the assembly and by their drain/source resistance.

Noting Mu the electric mobility, Vt the threshold voltage of the transistors, and Lmin the minimum length of the transistor connectable on power supply Valim, transition frequency Ft0 is given by the following relation:

$$Ft0 = Mu \cdot (Valim - Vt)/(2\pi \cdot Lmin2).$$

Amplitudes A and A' and durations T and T' are for example selected so that:

$$A = Valim;$$

$$A' = Valim - Vt;$$

$$T = (Ft0 + K)/(Ft0 \cdot K); \text{ and}$$

$$T' = (Ft0 + K')/(Ft0 \cdot K')$$

where K and K' respectively have values 4.108 Hz and 2.107 Hz and are selected according to the parasitic elements of the detection circuits and on the desired consumption. Such values define the limiting values enabling differentiating the detectors.

As a specific example of embodiment, with Mu=3.1010 µm2/V.s, Valim=5 V, Vt=0.65 V, Lmin=1 µm, a frequency Ft0 of approximately 20 GHz and durations T and T', respectively, of 2.55 ns and 50 ns are obtained.

According to a specific example of embodiment of the present invention applied to integrated circuits likely to operate under supply voltages V1 of 5.5 volts and V2 of 3.3 volts, the peaks sent by the qualification system have respective durations T of 10 nanoseconds and T' of 40 ns with respective amplitudes A and A' of approximately 4 V and 2.3 V.

Figure 12:
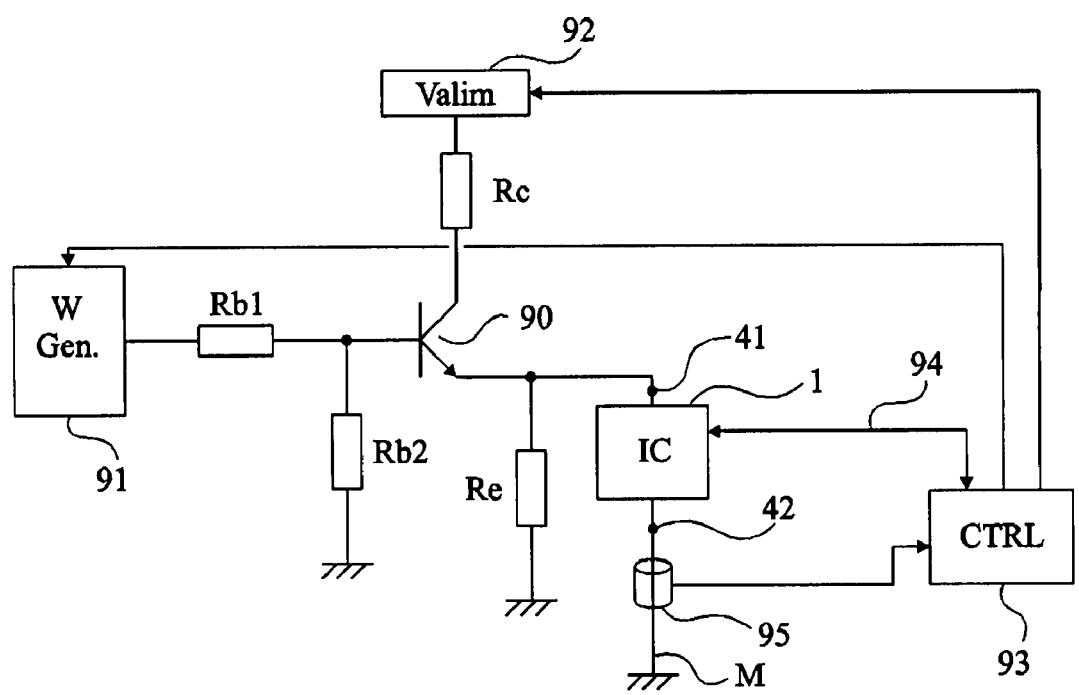
FIG. 12 is a schematic block diagram of an embodiment of an integrated circuit qualification system according to the present invention.
Figure 11:
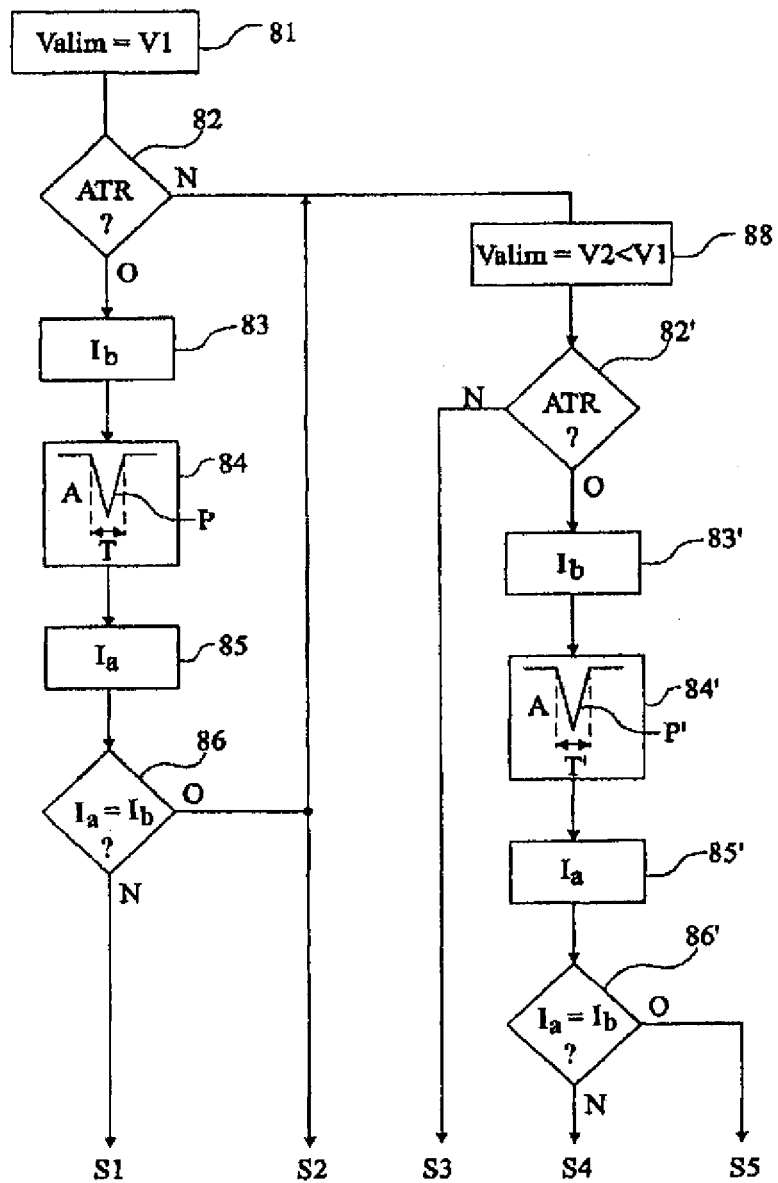

FIG. 12 very schematically shows in the form of blocks an embodiment of a qualification system according to the present invention. A circuit 1 to be tested (IC) is connected to the system by its terminals of application of a supply voltage. Supply voltage Valim (block 92, Valim) is applied to integrated circuit 1 via a transistor 90 (for example, an NPN-type bipolar transistor) having its emitter connected to terminal 41 and its collector connected, by a resistor Rc, to a terminal of application of the supply voltage, the transistor emitter being further grounded by a resistor Re. A wave generator 91 (W Gen.) has its output connected, by a resistor Rb1, to the base of transistor 90, this base being also grounded by a resistor Rb2. Generator 91 and block 92 for providing the supply voltage are controlled by a circuit 93 (CTRL) also connected (connection 94) on the one hand to circuit 1 to check its starting up on powering on, and on the other hand to an average current detector 95 placed for example between terminal 42 and ground M of application of supply voltage Valim.

In the quiescent state, in the absence of waves sent by generator 91, the circuit is powered, transistor 90 being on. The presence of a wave generated by generator 91 causes an abrupt opening of transistor 90, and thus a peak on the power supply of circuit 1. Current detector 95 enables exploiting average measurements of this current before and after the occurrence of noise peaks.

For the case where a gauge peak P2 must be applied by the system, the emitter of transistor 90 is then collected to a terminal (not shown) of application of a negative voltage to which is also connected resistor Rb2 by its terminal opposite to that connected to the base of transistor 90. Terminal 41 of circuit 1 is further connected, as well as resistor Re, to the transistor collector rather than to its emitter.

Of course, various alterations, modifications, and improvements will readily occur to those skilled in the art. In particular, although the present invention has been described in relation with an example of detectors of negative peaks on a positive power supply, it easily transposes to detectors of positive peaks on negative power supplies as well as to detectors of positive, respectively, negative peaks on positive, respectively, negative power supplies. Further, the practical implementation of the present invention based on the functional indications given hereabove is within the abilities of those skilled in the art by using available hardware and/or software tools. In particular, other test circuits than that of FIG. 12 may be envisaged.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for qualifying a parasitic supply peak detector of an integrated circuit, comprising steps of:
   supplying the integrated circuit at the power input with a first voltage level;
   checking a starting of the integrated circuit;
   applying at least one first noise peak to the power supply input, wherein the amplitude of the at least one first noise peak is selected to maintain a minimum voltage of supply of differential stages of the integrated circuit;
   comparing average currents consumed by the integrated circuit before and after the application of the at least one first noise peak; and
   qualifying the integrated circuit as containing at least one of a limited number of types of parasitic peak detectors or not containing a parasitic peak detector based at least in part upon the comparing of the average currents.

2. The method of claim 1, wherein said steps of applying further comprises applying at least one second noise peak different from the first noise peak.

3. The method of claim 2, wherein said second noise peak has an amplitude and/or time duration that is smaller or larger than a respective amplitude and/or time duration of the first noise peak.

4. The method of claim 1, wherein the limited number of types of parasitic peak detectors consists of:
   a first type capable of detecting a first noise peak;
   a second type capable of detecting a second noise peak that inverts the polarity of the voltage at the power supply input; and
   a third type capable of detecting a third noise peak having a time duration shorter than the first noise peak.

5. The method of claim 1, further comprising:
   supplying the integrated circuit at the power supply input with a second voltage level; and
   repeating the steps of checking, applying, comparing and qualifying, wherein the first and second voltage levels are selected according to a supply voltage range acceptable for operating the integrated circuit.

6. The method of claim 5 wherein an amplitude of the at least one first noise peak is selected according to the supplied first voltage level and a threshold voltage value of a transistor contained in the integrated circuit.

7. The method of claim 6, wherein a duration of the at least on first noise peak is selected according to a transition frequency of the transistor.

8. A system for qualifying a parasitic supply peak detector of an integrated circuit, comprising:
   controllable means for supplying at least a first voltage level at at power supply of the integrated circuit;
   means for measuring electrical current consumption by the integrated circuit;
   controllable means configured to apply at least one noise peak to the power supply input, wherein the amplitude of the at least one noise peak is selected to maintain a minimum voltage of supply of differential stages of the integrated circuit; and
   a unit of control and synchronization configured to compare a first current consumption by the integrated circuit before application of the at least one noise peak with a second current consumption by the integrated circuit after application of the least one noise peak and qualify the integrated circuit as containing one of a limited number of types of parasitic peak detectors or not containing a parasitic peak detector based upon the comparison.

9. A method for determining a type of a parasitic supply peak detector of an integrated circuit, the method comprising:
   supplying a power supply of the integrated circuit with a voltage at a first level;
   measuring a first average current value of the integrated circuit;
   applying a first noise peak to the power supply, the first noise peak associated with a first and a second type of parasitic supply peak detectors, wherein the amplitude of the first noise peak is selected to maintain a minimum voltage of supply of differential stages of the integrated circuit;

measuring a second average current value of the integrated circuit after applying the first noise peak; and comparing the first and second average currents of the integrated circuit to determine whether the integrated circuit includes the first or the second type of parasitic supply peak detectors.

10. The method of claim 9, further comprising:

checking whether the voltage at the first level is sufficient to start the integrated circuit.

11. The method of claim 9, wherein the first noise peak has an amplitude and length configured for causing a change in current when the integrated circuit has a parasitic supply detector that detects either an average value of voltage with respect to a threshold or an instantaneous value of voltage with respect to a threshold of same polarity.

12. The method of claim 11, further comprising:

supplying a power supply of the integrated circuit with a voltage at a second level, lower than the first level;

measuring a third average current value of the integrated circuit;

applying a second noise peak to the power supply;

measuring a fourth average current value of the integrated circuit after applying the second noise peak; and comparing the third and fourth average currents of the integrated circuit to determine whether the integrated circuit includes a third type of parasitic supply peak detector.

13. The method of claim 12, wherein the second noise peak has an amplitude and length configured for causing a change in current when the integrated circuit has a parasitic supply detector that detects an instantaneous reversal of polarity of the supply voltage.

14. A system for detecting a type of parasitic peak detector in an integrated circuit comprising a control unit configured to record a plurality of electrical current consumption responses of the integrated circuit to a plurality of different noise peaks applied to a power supply input of the integrated circuit powered at a first voltage supply level and to determine a type of parasitic peak detector contained in the integrated circuit based upon the plurality of electrical current consumption responses, wherein the amplitudes of the plurality of different noise peaks are selected to maintain a minimum voltage of supply of differential stages of the integrated circuit.

15. The system of claim 14, further comprising:

a controllable voltage supply configured to apply a first selectable voltage level to the power supply input of the integrated circuit;

a noise peak generator configured to apply the plurality of different noise peaks to the power supply input; and a current monitor configured to measure a first electrical current consumption of the integrated circuit before application of a noise peak and a second electrical current consumption after application of a noise peak.

16. The system of claim 15, wherein the control unit is further configured to compare the first electrical current consumption and second electrical current consumption.

17. The system of claim 15, wherein the plurality of different noise peaks comprises voltage peaks having different pre-selected amplitudes and/or time durations.

18. The system of claim 17, wherein one of the noise peaks has an amplitude sufficient to invert the polarity of voltage at the power supply input of the integrated circuit.

19. The system of claim 14, wherein the control unit is further configured to record a plurality of electrical current consumption responses of the integrated circuit to the plurality of different noise peaks applied to the power supply input of the integrated circuit powered at a second voltage supply level and determine a type of parasitic peak detector contained by the integrated circuit based upon the plurality of electrical current consumption responses recorded for the first and second voltage supply levels.

\* \* \* \* \*

UNITED STATES PATENT AND TRADEMARK OFFICE
CERTIFICATE OF CORRECTION

| | | |
|---|---|---|
| PATENT NO. | : 8,283,931 B2 | |
| APPLICATION NO. | : 11/818691 | |
| DATED | : October 9, 2012 | |
| INVENTOR(S) | : Alexandre Malherbe et al. | |

It is certified that error appears in the above-identified patent and that said Letters Patent is hereby corrected as shown below:

In the drawings:
Replace Figure 11 with the attached Figure 11

Col. 6, line 66, should read:
measures and stores (block 83, $I_b$) average current $I_b$ of the Col. 7, lines 12-13 should read:
The system then measures (block 85, $I_a$) and memorizes average current $I_a$ after the noise peak, to determine whether Col. 7, line 16 should read:
Then, the system compares (block 86, $I_a=I_b$?) the average Claim 1, col. 9, line 61 should read:
supplying the integrated circuit at a power supply input with a Claim 2, col. 10, line 8 should read:
The method of claim 1, wherein said step of applying further comprises applying Claim 7, col. 10, line 35, should read:
one first noise peak is selected according to a transition fre- Signed and Sealed this
Twenty-fifth Day of December, 2012

David J. Kappos
*Director of the United States Patent and Trademark Office*

CERTIFICATE OF CORRECTION (continued)
U.S. Pat. No. 8,283,931 B2

Claim 8, col. 10, line 40, should read:

level at a power supply input of the integrated circuit;

Claim 8, col. 10, line 52, should read:

after application of the at least one noise peak and qualify